Dec. 5, 1950 C. E. OVERTON 2,532,934
ARBOR
Filed Jan. 29, 1948 5 Sheets-Sheet 1

Inventor
Carl E. Overton.
By: Mann and Brown
Attys.

Dec. 5, 1950     C. E. OVERTON     2,532,934
ARBOR

Filed Jan. 29, 1948     5 Sheets-Sheet 3

Inventor
Carl E. Overton
By:- Mann and Brown
Attys.

Dec. 5, 1950 C. E. OVERTON 2,532,934
ARBOR
Filed Jan. 29, 1948 5 Sheets-Sheet 5

Inventor
Carl E. Overton
By: Mann and Brown
Attys.

Patented Dec. 5, 1950

2,532,934

UNITED STATES PATENT OFFICE 2,532,934

ARBOR

Carl E. Overton, Chicago, Ill.

Application January 29, 1948, Serial No. 5,163

21 Claims. (Cl. 279—2)

My invention relates to an arbor used to hold the work or forming device on a rotary machine tool. It may be adapted to maintain either an external or internal grip on work to be machined in a lathe or the like, or it may be adapted to grip a forming tool, as for instance a gear bob. The present application is a continuation-in-part of my earlier application filed October 1, 1945, bearing Serial No. 619,548, now abandoned.

The important requirements of such a device are: first, that it accurately position the internal bore or external face of the workpiece or tool concentric with the axis of rotation of the arbor; second, that it hold the workpiece or tool with sufficient rigidity to withstand the forces incidental to metal-removing operations; and third, that the arbor be quick-operating for engaging and disengaging the workpiece or tool.

The general object of my invention is to provide an arbor to meet these three requirements. It is my further purpose to provide an arbor of simple construction that will maintain its working efficiency and accuracy for long service periods.

A further object of the invention is to provide an arbor of this type for use on a rotatable work or tool support, with the arbor being designed for remote control through the head stock by a suitably controlled arrangement. Under different situations it may be desirable that this control be manual, mechanical, electrical, or fluid operated, and in each instance my arbor is readily adaptable for such purpose.

Broadly stated, these objects are attained by employing an arbor assembly adapted to expand radially in response to relative rotation of an eccentric incorporated therein, the arbor assembly being concentric to its axis of rotation when expanded into rigid engagement with a workpiece or forming tool. The term "expand" as used herein is intended to cover the action of the gripping member in a female arbor wherein the gripping member moves radially inward to engage the workpiece placed in the bore of that arbor.

In another embodiment of the invention, the gripping action is effected, not by relative rotation of two members, but by relative axial movement of such members along cam faces.

Other objects and advantages of my invention include; providing an expansible arbor that is self-locking in the sense that it is inherently capable of maintaining its expanded state without the necessity for any special locking or latching expedient; providing an arbor that will effectively engage a workpiece without regard to the direction in which the workpiece is rotated in the metal-removing operation; and providing an arbor having a minimum number of essential parts, which parts may be readily constructed with the high degree of accuracy required by relatively simple metal-forming operations, as for example, by machining on a lathe.

The above and other objects of my invention will be apparent from the following detailed description, taken with the accompanying drawings:

Figures 1, 2, 3:
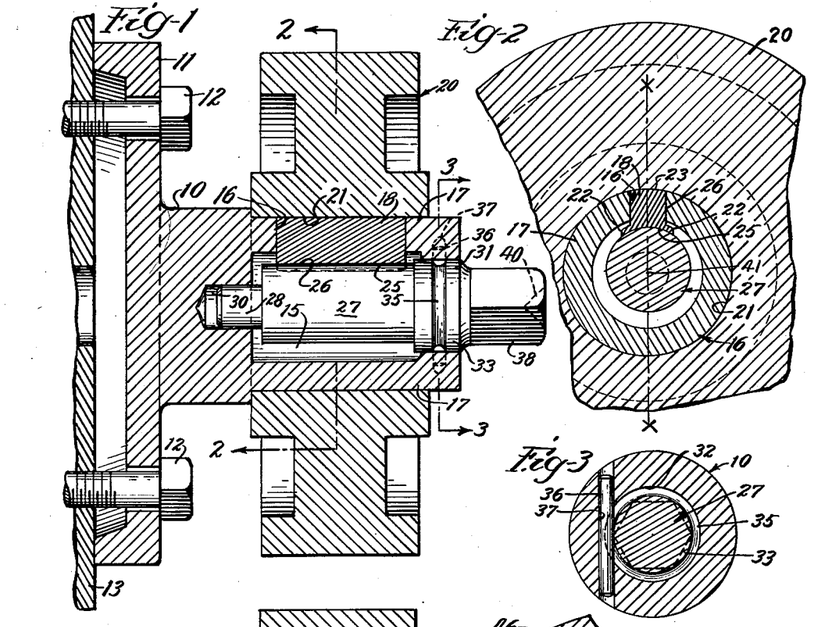
Fig. 1 is a longitudinal sectional view of a preferred embodiment of my invention, with the eccentric member shown in side elevation.
Fig. 2 is a fragmentary transverse section taken on the line 2—2 of Fig. 1.
Fig. 3 is a transverse section taken on the line 3—3 of Fig. 1.

In Figs. 1 to 3, illustrating a preferred practice of my invention as applied to a male arbor such as may be used for mounting on a lathe, the arbor assembly includes an arbor body, generally designated 10, of circular cross-sectional configuration that is adapted in any well known manner for mounting on the rotary workholder of a machine tool. In the particular construction shown the arbor body 10 has a flanged or enlarged base 11 that is mounted, by suitable screws 12, on the face plate 13 of a lathe head stock.

The arbor body 10 is of hollow construction forming a longitudinal chamber 15, and has an aperture 16 in its circumferential wall 17 to slidingly guide what may be termed a key or tightening member 18. The tightening member 18 extends and retracts for radial expansion and contraction of the arbor assembly, whereby the expanded assembly may rigidly engage a workpiece 20, as indicated in Fig. 1. The particular workpiece 20, shown in Fig. 1, is a gear blank having a center bore 21.

Preferably some expedient is provided for limiting the outward movement of the tightening member 18 to assure retention of the tightening member in the arbor assembly in the absence of a workpiece. A suitable expedient for this purpose is to enlarge the inner end of the tightening member 18 by providing inner flanges or tongues 22, the cross dimension of the tightening member at the tongues being greater than the corresponding cross dimension of the aperture 16. The tightening member is so constructed that the tongues do not prevent the normal extension of the tightening member into effective engagement with a workpiece.

Figures 6, 7, 8:
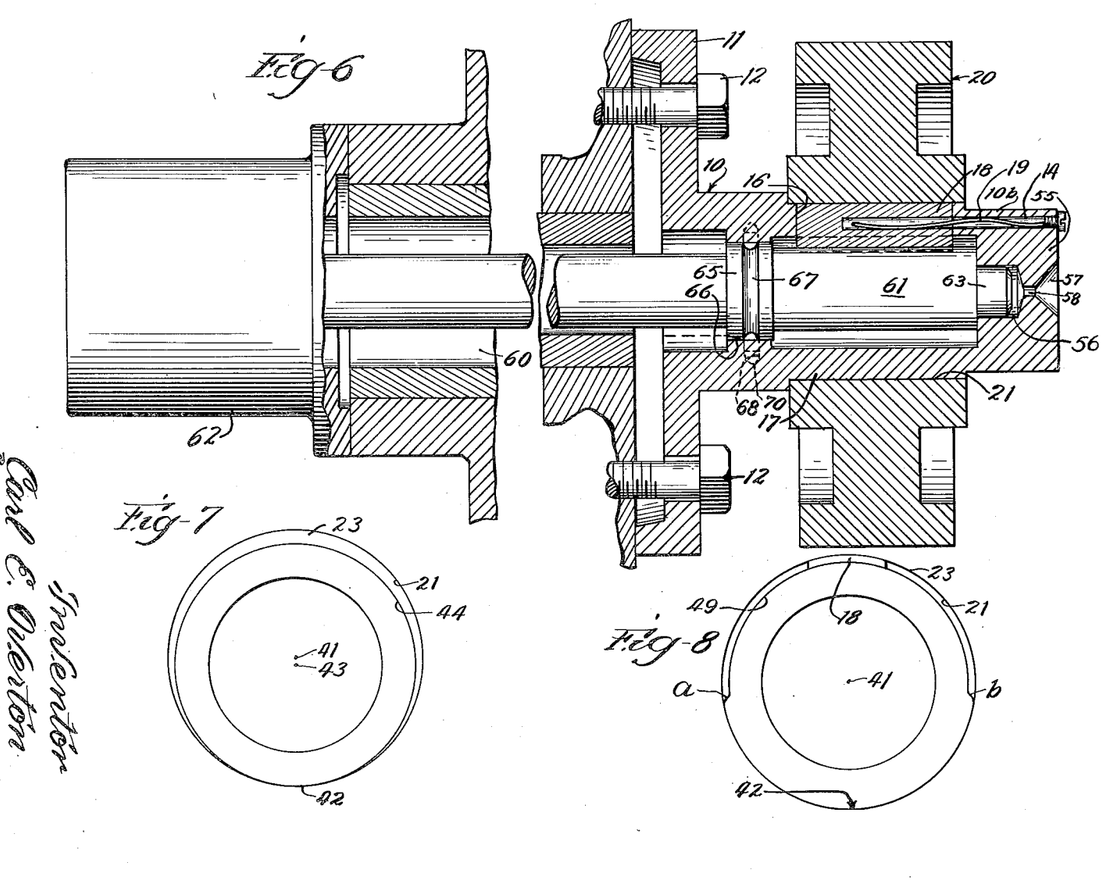
Fig. 6 is a view, partly in longitudinal section and partly in side elevation, of a third form of the invention especially suitable for remote or automatic control.
Figs. 7 and 8 are diagrams indicating different practices of the invention.
Figure 9:
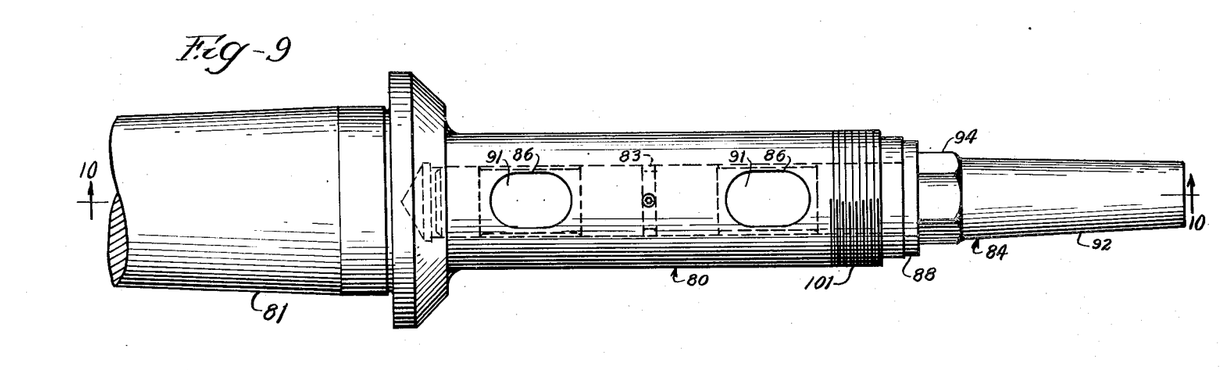
Fig. 9 is a plan view of an arbor particularly suited for gear hobbing operations.
Figure 10:
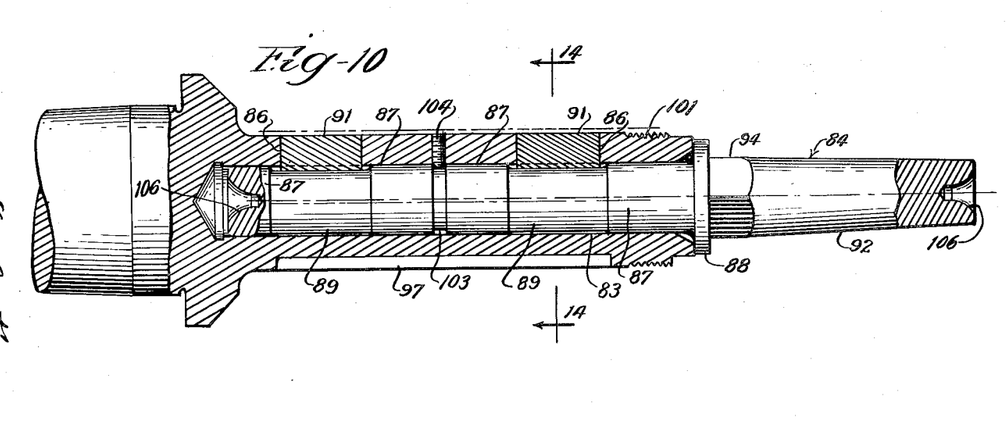
Fig. 10 is an elevation of the arbor shown in Fig. 9 with portions thereof in section.

Another means of preventing the tightening member from coming out is illustrated in Fig. 6. Here a wire spring 19 is inserted through the opening 14 in the arbor and tightening member. The spring may be in leaf form, as well as wire form, and in some embodiments it may be desirable to have it extend all the way through the tightening member and then into the arbor body at the far side of the tightening member.

An additional advantage of the use of the spring 19 is that by giving the wire a pre-set it may be used to hold the tightening member against the eccentric 61. Thus, when the eccentric is rotated into withdrawn position, the tightening member will be retracted, and the workpiece may be readily slipped on and off the arbor.

The outer face 23 of the tightening member 18 is curved for contact with the inner surface of the center bore 21, while the inner face 25 of the tightening member may be curved to conform to the cylindrical surface 26 of an eccentric, generally designated 27, that is rotatably journaled in the hollow arbor body 10.

In the particular construction shown the eccentric 27 is formed at its inner end with a trunnion 28 that is journaled in a suitable recess or bore 30 at the inner end of the chamber 15. The eccentric extends through the outer end wall 31 of the arbor body 10, and is suitably seated in the outer end wall. In the particular construction shown the outer end wall 31 has a relatively large bore 32 to serve as a bearing, and the eccentric 27 has an enlarged circular portion 33 that is journaled in this bore.

Any suitable expedient may be employed to keep the eccentric 27 from moving longitudinally outward from the normal position shown in Fig. 1. To this end I may form a circumferential groove 35 in the enlarged portion 33 of the eccentric and drive a suitably tapered pin 36 into a bore 37 in the arbor body 10, in the manner best shown in Fig. 3, the tapered pin extending tangentially into the circumferential groove 35 to prevent relative axial movement of the eccentric.

The eccentric 27, in the form of the invention shown in Figs. 1 to 3, is adapted for actuation by a suitable tool, and for this purpose the eccentric has an outer end portion 38 of hexagonal cross-sectional configuration whereby a suitable wrench may be applied to the end portion for rotating the eccentric relative to the arbor body 10.

It may be desirable that such an arbor be adapted for supporting or reinforcing engagement by the tail stock of a lathe. I therefore prefer to construct the eccentric 27 with a suitable conical recess 40 in its outer end for engagement by the conical tip of a tail stock. When the assembly is constructed for such cooperation with a tail stock the inner bore 30 and the larger outer bore 32 in the arbor body 10 are concentric to the axis of rotation of the arbor body, and the conical recess 40 on the end of the eccentric member 27 is concentric to the trunnion 28 and the enlarged portion 33 of the eccentric.

It is important, of course, that the expanded arbor assembly, comprising the arbor body 10, the tightening member 18, and the eccentric 27, position the workpiece 20 concentric to the axis of rotation of the arbor assembly. In other words, the expanded diameter of the arbor assembly in the plane of the tightening member 18 must be centered on the axis of rotation. Thus, on the diameter indicated by the line X—X in Fig. 2, passing through the axis of rotation indicated at 41, the radial distance from the outer face 23 of the tightening member to the axis of rotation is the same as the radial distance from the axis of rotation to the peripheral point 42 (Fig. 7) on the arbor body directly opposite from the tightening member.

In one practice of my invention the outer circumferential wall 17, on which the workpiece 20 is to be mounted, is a true circle in cross-section but is made a shade less in diameter than the center bore 21, say, .001 inch or .002 inch less, so that the workpiece 20 has what may be termed a "slip" fit thereon, the function of the tightening member being merely to make the fit more snug after the workpiece is in place.

In this practice the axis of curvature of the outer circumferential surface of the circumferential wall 17 of the arbor body 10 is slightly offset or eccentric with respect to the axis of rotation of the arbor assembly. The eccentricity relative to the axis of rotation is, of course, hardly perceptible at a glance because the diameter of the arbor body is so close to the inside diameter of the workpiece.

Fig. 7 shows diagrammatically the relationship in a grossly exaggerated manner. In this figure the axis of rotation 41 of the arbor assembly is equidistant from the outer face 23 of the tightening member 18 and the diametrically opposite point 42 on the arbor, as heretofore pointed out. The axis of curvature 43 of the circle 44, representing the circumference of the arbor body 10 at the circumferential wall 17, is offset in compensation for the difference between the diameter of the workpiece center bore 21 and the diameter of the arbor body 10. The distance from the axis 41 to the axis 43 is one-half the difference between the two diameters, and the axis 43 lies substantially on the same diameter as the point 42.

It may appear on paper that the arrangement shown diagrammatically in Fig. 7 provides what is, in effect, two-point contact with the workpiece bore 21 and that such limited contact would not be sufficient to hold the workpiece in a rigid manner. In practice, however, actual contact is effective for a substantial distance circumferentially in both directions from the point 42. A feature of this practice is that the contact is effective to hold the gear rigid even when the gear bore is several thousandths of an inch larger than the arbor body. Therefore, the same arbor assembly may cooperate with blank bores varying in diameter within limits.

In a second practice of the invention the periphery of the arbor body 10 that receives the center bore 21 of the workpiece 20 is of broken configuration, but at least nearly half of the periphery is concentric to the axis of rotation of the arbor assembly. This second practice is exemplified by Fig. 8.

In Fig. 8 slightly less than one-half of the circumference of the arbor body from point a to point b is concentric to the axis of rotation 41 and is of substantially the same radial dimension as the bore 21 of the work piece. The remaining periphery of the arbor body in Fig. 8 is cut away, say, to a smaller diameter indicated at 49, the tightening member 18 being centralized with respect to this cut-away portion. It is apparent that the arrangement illustrated in Fig. 8 provides exceedingly snug contact without any distorting strains over substantially one-half of the arbor and additionally over the circumferential extent of the outer face 23 of the tightening member 18.

It is to be understood that the structure shown in the drawings may conform to either of the practices illustrated by Figs. 7 and 8.

The manner in which the described arbor operates will be readily apparent from the foregoing description. When the arbor assembly is ready to receive a workpiece, the eccentric 27 is rotated a half turn, or nearly a half turn, from the position indicated in Fig. 1 to permit the tightening member 18 to be retracted toward the interior of the arbor body 10. With the arbor assembly in this contracted state the workpiece 20 is slipped onto the arbor body. The operator then applies a suitable wrench to the end portion 38 of the eccentric to rotate the eccentric to the position indicated in Figs. 1 and 2, thereby firmly securing the workpiece in place.

One of the features of my invention is the fact that the eccentric may be designed to maintain its work-engaging position inherently. Thus, in the arrangement shown in Figs. 1 and 2, the surface of the eccentric in pressure contact with the tightening member 18 and the journal surfaces of the eccentric in pressure contact with the arbor body 10 are of such extent that friction prevents reverse or loosening rotation of the eccentric. In this regard it will be noted that the eccentricity of the eccentric 27 is slight, so that the reaction force from the tightening member 18 creates only a slight moment tending to reverse the rotation of the eccentric. In effect the eccentric mechanism is irreversible.

Figure 4:
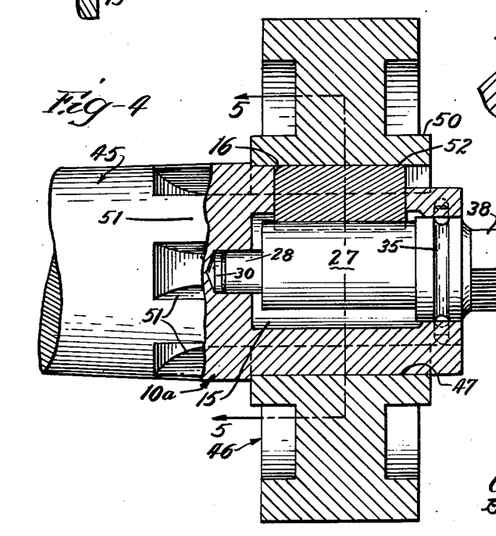
Fig. 4 is a view similar to Fig. 1, showing a second form of my invention for use with splined workpieces.
Figure 5:
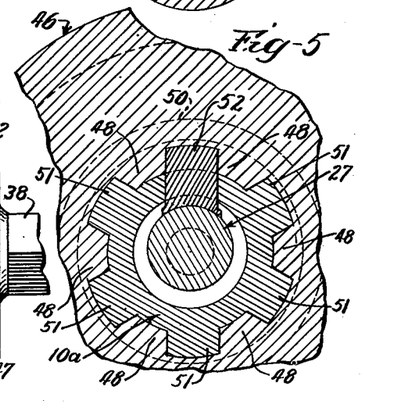
Fig. 5 is a fragmentary transverse section taken as indicated on the line 5—5 of Fig. 4.

The second form of the invention, shown in Figs. 4 and 5, is largely similar to the first form, as indicated by the use of corresponding numerals to indicate corresponding parts. In this second form of the invention the arbor body, generally designated 10a, is shown with a tapered shank 45 to illustrate how the arbor body may be adapted for other modes of mounting on workholders. The tapered shank 45 is adapted to removably seat in the tapered socket of a workholder in a well known manner.

This second form of the invention is adapted to hold a workpiece 46, having a center bore 47 formed with splines 48, the particular workpiece illustrated being a gear blank with a splined hub 50. The hollow arbor body 10a is of an external cross-sectional configuration that is generally complementary to the internal configuration of the workpiece 46. Thus the hollow arbor body 10a is provided with a plurality of external splines 51 to mesh with the internal splines 48, as indicated in Fig. 5.

A tightening member may be mounted in the arbor body 10a in any suitable manner for radial movement to engage the workpiece 46. In the particular arrangement shown in Figs. 4 and 5, the tightening member 52 is a block dimensioned to mesh with the internal splines 48 in the same manner as the external splines 51. It will be noted in Fig. 5 that there are five external splines 51 on the arbor body to mesh with the internal splines 48 of the workpiece 46, the tightening member 52 serving as a sixth external spline.

The third form of the invention shown in Fig. 6 is also similar in many respects to the first form of the invention, as indicated by the use of corresponding numerals to designate corresponding parts. The arbor body 10b, which is mounted on a lathe head stock 53 by means of screws 12, is of the usual cross-sectional configuration to enter the center bore 21 of the workpiece 20. The outer end of the arbor body 10b is closed by an end wall 55 in which is formed an inner bearing recess 56 and an outer conical recess 57, the two recesses being shown interconnected by an oil bore 58. The outer recess 57, which is concentric with the axis of rotation of the arbor assembly, is adapted to receive and be supported by the tail stock of the lathe.

The head stock 53 has the usual axial opening 60, and the hollow interior of the arbor body 10b is alined with the axial opening 60 to make one continual passage. An eccentric 61 is mounted in the hollow arbor body 10b and extends at its inner end through the axial opening 60 in the head stock 53 to a remote control mechanism 62 mounted on the far side of the head stock.

The eccentric 61 has a trunnion 63 at its outer end journaled in the previously mentioned bearing recess 56, and has an enlarged journal portion 65 mounted in a bearing 66 formed inside the arbor body. To prevent axial displacement of the eccentric 61 the journal portion 65 may have a circumferential groove 67 for engagement by a tapered pin 68 in a tangential bore 70 in the manner heretofore described.

The tightening member 18 is mounted in the arbor body 10b, in contact with the eccentric peripheral surface of the eccentric 61 to perform the usual function of rigidly securing the workpiece 20 on the arbor assembly. The remote control mechanism 62, for actuating the eccentric, may be any of the well known electric, pneumatic or hydraulic devices for such purpose.

The operation of the arrangement shown in Fig. 6 may be readily understood. Instead of using a wrench to rotate the eccentric 61 for engaging and releasing workpieces 20, the operator relies upon the remote control mechanism which includes some type of clutch for engaging the eccentric 61.

In the gear manufacturing industry it is agreed that the most important part of a gear is the involute form on the profile of the gear tooth. The closer this form is to the theoretically correct involute form, the better will be the gear produced. A perfect gear tooth form makes a gear operate more quietly with smoother action and enables the gear to stand heavier loads and higher speeds.

The most common method of machining gear teeth is by a generating action called hobbing. The tool used for this purpose is called a hob. This hob, or cutter, is mounted on the cutter spindle of the hobbing machine. The cutter spindle is also called an arbor and is the arbor under discussion.

Gear authorities generally agree that the greatest cause of faulty involute tooth form on the gear tooth is due to the improper positioning of the hob on the arbor. Hob manufacturers recommend that for good accuracy, both ends of the hob must be concentric with the axis of rotation of the hob spindle within .0002" (two ten-thousandths) total indicator reading. This is checked in position by indicating runouts at both ends of the hob on special surfaces provided on the hob for this purpose.

The common method of holding the hob on the arbor is by the conventional threaded nut and one or more washers. The disadvantages of this method are as follows:

1. The bore of the hob may vary within limits due to manufacturing tolerances. This may vary from .0001" to .0004" oversize. The arbor also may vary in size for the same reason, from true size to .0002" undersize. If the hob bore is at the high limit and the arbor diameter at the low limit, there would be .0006" clearance between the two members and it would be possible for the hob to run eccentric by .0006". The operator would then have to true up the hob by hammering the hob back and forth until it was true. If, however, the hob bore is at the low limit and the arbor at the high limit, the hob would not fit readily on the arbor. In this case the operator may try to hammer the hob in place and sometimes springs the arbor out of true center in the process.

2. After the hob is trued up, it sometimes slips out of line when hitting a hard spot in the material because it actually is floating, held only by end pressure on the hubs of the hob.

3. If the nut and washers, or either one are not perfectly square with the bores, when the nut is drawn up tight, the arbor will tend to spring out of true center because of uneven pressure on the ends of the hob. Also this same condition can occur if the ends of the hob itself are not true with the hole.

4. If many hobs were forced on and off the arbor, the friction would tend to wear the arbor diameter, thereby causing even more runout.

In an effort to correct this situation a number of gear manufacturers have installed tapered arbors on their machines, with which they use hobs having tapered holes for installations where extreme accuracy is required. Theoretically, a tapered hole hob will automatically center itself on the arbor as it is forced up on the taper, and thereby eliminate hob eccentricity. This force is applied with the same nut and washer that is used on the straight arbor.

The tapered hob arbor is not accepted, however, by many gear authorities because it has certain disadvantages. Many manufacturers have installed taper arbors only to return again to the original straight arbors.

Some of the disadvantages of the taper hole hobs are as follows:

1. Since the tapered hole hob is locked by applying pressure against the ends of the hubs with a washer and nut, any lack of trueness for the washer or nut would tend to spring the arbor.

2. If either end of the tapered hole in the hob is not exactly in line with the opposite end, the hob would tighten up on one end only and tend to be loose and wobble at the other end. That is, the angle of taper of both the hob hole and the arbor diameter must be perfect, which is a very difficult machine operation.

3. Because of the extreme accuracy required on the taper, small pieces of dirt or chips in the taper would tend to throw the hob very much out of line.

4. Many hobs, if changed from straight hole to taper hole, would have to be made larger in diameter to accommodate the increase in the bore due to the taper, and the price of the hob would be increased, a very important point to the hob user.

5. Taper hole hobs are more difficult and expensive to manufacture than straight hole hobs.

The invention herein disclosed has been applied to hob arbors, and in such installations it has been found to have the following advantages over straight and tapered arbors.

1. No collars or nuts need be tightened against the ends of the hob, since the locking pressure is sufficient to keep the hob from moving sideways under the pressure of the cut. This eliminates springing the arbor out of line with unsquare collars. However, such collars or nuts may be used for additional safety, if not screwed up too tightly.

2. If the hob faces are not square, it will not affect the trueness of the hob.

3. Straight hole hobs can be used instead of taper hole hobs, a large saving to both user and manufacturer.

4. The arbor can be made small enough to slip the hob easily on and off the arbor, eliminating dangerous hammering and saving operator time.

5. The hob is automatically trued up in the locking of the keys which is a saving of operator time.

6. By using the compensating eccentricity in the arbor diameter, as taught by the invention, it is possible to guarantee concentricity to one-half the bore tolerance of the hob, which rarely exceeds .0002" to .0003". This would result in an accuracy of .0001" to .00015" on concentricity.

7. Smaller diameter hobs can be used in some cases, a large saving over a period of a year to the gear manufacturer.

Figs. 9, 10, 11, 14 and 15 illustrate an arbor embodying my invention, particularly suited for the mounting of a hob. The arbor may be mounted in conventional hob arbor bearings, as shown on pages 26 and 27 of Barber Colman Company Handbook L, dated 1942. The body of the hob arbor, generally designated 80, is formed with a tapered inner end 81 for mounting in a main bearing 82. As shown in the case of the workpiece arbor, the body 80 has a substantially central opening 83 into which is inserted an eccentric or camming member, generally designated 84. Two aligned openings 86 are cut in the peripherial wall of the body 80, which openings communicate with the central opening 83.

The two ends and the intermediate bearings 87 of the eccentric member 84 rotatably support it within the axial bore 83. It is longitudinally held in position within the bore by a set screw 104 which cooperates with a groove 103 formed in the intermediate bearing 87. When so positioned, two eccentric portions 89 of eccentric member 84 coincide longitudinally with openings 86 in the body 80. These eccentric portions 89 are circular in cross section, but have their centers offset from the axis of the bore 83, thus providing the eccentric action from which member 84 derives its designation. Two tightening members 91 are positioned within the openings 86, and cooperate with the eccentrics 89 to clamp the hob securely on the arbor.

It will be noted that the tightening member 91 is formed with a substantially flat base in contact with the eccentric 89. This form of tightening member may be desirable to use with any of the types of arbors.

A tapered outer portion 92 of eccentric 84 is adapted to be received within tapered outboard bearing 93. In addition the outboard end of the eccentric 84 is provided with a polygonal portion 94 to which a wrench may be affixed for rotation of the eccentric with respect to the arbor body.

In cutting gear teeth a considerable load must be placed upon the hob and the action must be transmitted therethrough from the arbor. For this reason it is preferred to employ a key 96 engaged in a keyway 97 in the arbor body 80 and a keyway 98 in the hob 99. In some practices of the invention the use of the key may be dispensed with, as the frictional resistance between the hob, and the arbor body and tightening members will be sufficient to prevent slippage between the hob and the arbor.

The outboard end of arbor body 80 may be threaded as at 101, and a nut 102 applied with mild pressure to prevent the hob from coming off should the hob securing device, just described, for some reason fail.

The outboard end of the arbor is preferably provided with a boss or shoulder 88 to normally fix the position of the member 84 within the bore 83.

Either of the methods shown in Figs. 7 and 8 may be used in the construction of the hob arbor to assure that the hob will be readily demountable from the arbor, and yet when emplaced thereon, will have an axis of rotation concentric to the axis about which the teeth of the hob were machined. The hob arbor illustrated, incorporates the method shown in Fig. 7, as this is preferable from the standpoint of production of the arbor. In using this design, the eccentric 84 may be machined from a steel blank by mounting the blank between the centers of the lathe, the centers being mounted in apertures 106 (Fig. 10) at either end of the eccentric 84. It also will be apparent that the machine operations on the arbor body 80, determinative of the accuracy of the finished arbor, can also be performed on a lathe. This ability to do the machining operations essential to the accuracy of the finished arbor in a simple manner is an outstanding attribute of my invention.

Figure 11:
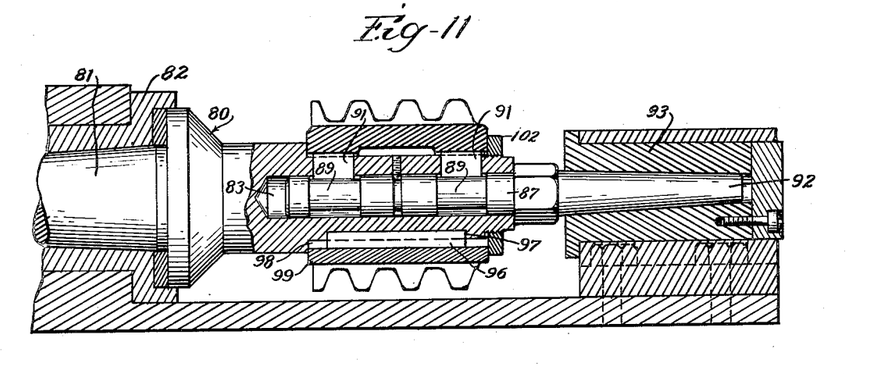
Fig. 11 is a sectional view of the hob arbor shown in Figs. 9 and 10 with the arbor mounted in bearings and with the hob affixed thereon.

It is, of course, obvious that the eccentric 84 may be rotated in either direction in relation to the arbor body 80 to expand the tightening members 91 into the clamping position against the bore of the arbor. When the arbor, shown mounted in Fig. 11, is revolved, whatever friction exists between the bearing 93 and the end 92 of the eccentric will tend to induce rotation between the eccentric and the arbor body. Thus, if when the eccentric is rotated in relation to the arbor body to expand the tightening members, such rotation is done in a direction opposite to that in which the hob is to be revolved, the frictional resistance between bearing 93 and eccentric end 92 will cooperate with the internal frictional resistance of the arbor to keep the arbor tightly locked.

Figure 12:
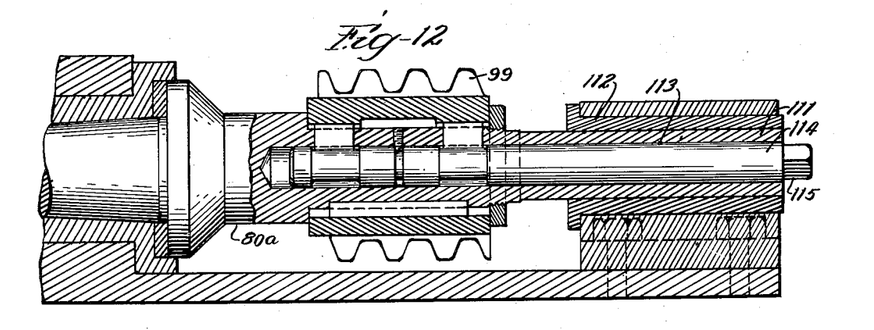
Fig. 12 is a sectional view of a modified form of the hob arbor.

Fig. 12 illustrates a modification of the hob arbor in which the arbor body 80a is provided with an outboard extension 111 adapted to be received within an outboard bearing 112. The end 111 of the arbor body has a passage 113 therein, through which passes the outboard end 114 of eccentric 84. In this instance the hexagonal portion 115, used to facilitate the obtaining of a grip on the eccentric, is placed beyond the end of the outboard bearing.

Figure 13:
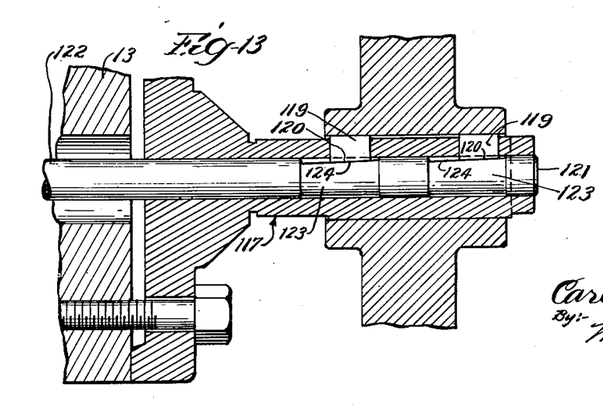
Fig. 13 is a sectional view of a modification of my invention and illustrates an arbor particularly suited to be operated by electrical, fluid, or mechanical means, and used for either the mounting of workpieces or forming tools. In this view a workpiece is shown mounted on the arbor for the purpose of illustration.
Figure 14:
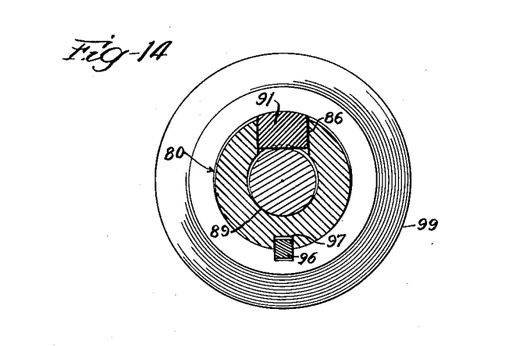
Fig. 14 is a section taken at line 14—14 of Fig. 10.
Figure 15:
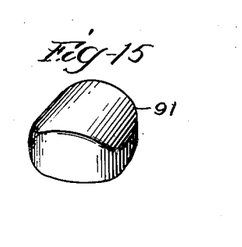
Fig. 15 is a perspective view of a tightening member used in the hob arbor.

Fig. 13 illustrates an arbor particularly adapted for use in automatic, or semi-automatic operations, where expansion and contraction of the tightening members is to take place in response to apparatus operated by mechanical, fluid, or electrical means. Such apparatus may be highly desirable where a succession for forming tools or workpieces are to be emplaced and removed from an arbor. For purposes of illustration an arbor body 117 is shown bolted to the face plate 13 of a lathe. The arbor body 117 is similar in construction to the workpiece arbor of Fig. 6, except that a draw rod, rather than an eccentric, is used to cause movement of the tightening members 119. Tightening members 119 have true inner ends disposed at an acute angle in relation to the axis of the arbor, as shown at 120. Preferably, this angle is between five to fifteen degrees.

A circular draw rod 121 is disposed within the circular bore of the arbor body and has one end 122 extending through the head stock of the lathe. Suitable means, electrically, mechanically, or fluid operated, are affixed to the end 122 to provide longitudinal motion for the draw rod with respect to the arbor body. Reduced portions 123 of draw rod 121 are positioned adjacent the tightening members 119, and may be formed by turning a slight taper while the axis of the draw rod is displaced slightly from the axis of rotation, or the taper may be flat as by milling or shaping. In any event the upper edges 124 should be parallel to the bottom edges 120 of tightening members 119. In this way longitudinal movement of the draw rod to the left will result in firm expansion of the tightening members, while longitudinal movement to the right will allow the tightening members to recede within the arbor body. Various modifications of this embodiment will be readily apparent from a study of the other forms of my invention, previously illustrated.

It should be understood that in all forms of my invention, the portion of the arbor that receives the hob or workpiece is preferably turned on a center that is slightly offset from the axes of rotation of the arbor in a direction opposite to the movement of the tightening member when urged to clamping position, for reasons elsewhere explained.

Figure 16:
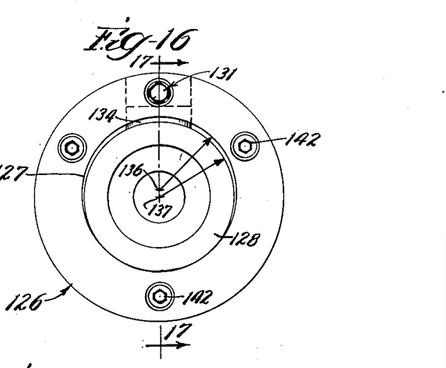
Fig. 16 is an end elevation of a female arbor embodying my invention.
Figure 17:
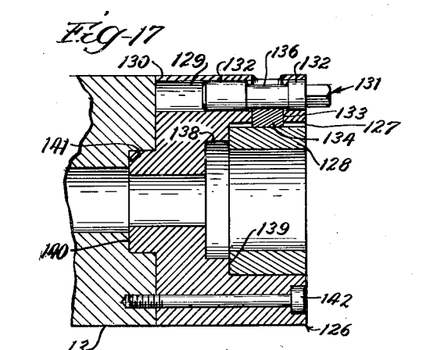
Fig. 17 is a sectional view taken on line 17—17 of Fig. 16.
Figure 18:
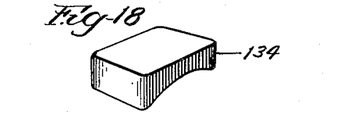
Fig. 18 is the perspective view of a tightening member for use with the female arbor.

Figs. 16 through 18 inclusive illustrate the manner in which my invention may be applied to a female arbor. An arbor body, generally designated 126, is mounted on the face plate 13 of a head stock, and is provided with an internal opening 127 for the reception of a workpiece 128. A longitudinal opening 129, disposed between the central opening 127 and the periphery 130 of the arbor 126, is fitted with an eccentric, generally designated 131, having bearing portions 132 which align the eccentric within the opening 129. Communicating between openings 127 and 129 is a third opening 133 into which is fitted a tightening member 134. Between the bearing portions 132 of eccentric 131 is a third circular portion 136 having its axis offset from that of the portions 132 to provide the eccentric motion desired for the actuation of tightening member 134.

The bore 127 of the female arbor may be offset from the axis of rotation in order that, after the workpiece has been inserted and clamped into place, the workpiece will then rotate on true center. Referring to Fig. 16, the axis of the bore is shown at 136, while the axis of rotation is shown at 137. As in the case of the male arbor, the offset from the axis of rotation is made in a direction opposite to that of the movement of the tightening member when clamping the workpiece in place.

Other features of construction of the female arbor, as shown in Figs. 16 and 17, will be familiar to those acquainted with the art. A counterbore 138 at the rear of the workpiece bore 127 provides a shoulder 139, against which the workpiece may be abutted for rapid alignment and at the same time allow the boring bar or other forming tool to be moved across all of the inner face of the workpiece. A shoulder 141 is formed on the rear face of the arbor to cooperate with a circular recess 140 in the face plate 13 to provide positive alignment of the arbor in relation to the axis of rotation. Stud bolts 142 are used to fasten the arbor to the face plate.

Fig. 7 has been used as a basis for illustrating and describing in a male arbor the manner in which the portion of the arbor, which receives the workpiece or forming tool, is made eccentric to the axis of rotation in order that when the workpiece or forming tool (herein referred to as an object to be mounted on the arbor) is emplaced and wedged into place, the axis of the workpiece will tend to coincide with the axis of rotation of the arbor. In this case the amount of offset of the arbor in relation to the axis of rotation is made equal to the amount of clearance that is used to assure that the object will readily slip onto the arbor, i. e., E (eccentricity) is made equal to $R_b$ (radius of the bore) minus $R_a$ (radius of the arbor). However, in this case it has been assumed that $R_b$ will, for practical purposes, remain a constant. Any variation of the actual $R_b$ over or below the theoretical $R_b$ will result in a variance of the axis of the object in relation to the axis of rotation.

As is the usual practice, the radius of the bore may be formed within certain tolerance limits over and below the desired figure, the total amount of this variation being the total radial tolerance allowable (T). In such a case the radius of the bore, which radius is the mean of maximum and minimum tolerances, should revolve about a point which coincides with the axis of rotation of the arbor, in order that any variations in respect to the axis of rotation be distributed evenly at either side of the true axis of rotation. To do this E (eccentricity) will be equal to ½T (total amount of radial tolerance permitted). This assumes that $R_{min}$ (the smallest radius of the bore permitted) is equal to $R_a$ (radius of the arbor). However, since $R_{min}$ would not slip onto the arbor, a radial clearance C must be allowed to permit emplacement and removal of the object, thus the formula for computing the amount of eccentricity to be given the arbor will be $$E = C + \tfrac{1}{2}T$$

This can be visualized by examination of the exaggerated diagram of Fig. 19 in which $R_s$ is the mean specified radius, $R_{max}$ is the radius at the maximum tolerance allowed above the specified radius, $R_{min}$ is the minimum radius allowed below the specified radius, and $R_a$ is the radius of the arbor. To keep the resultant errors caused by the tolerance allowances as low as possible, $R_s$ should have an axis of generation which will coincide exactly with the axis of rotation 146. Therefore, the total eccentricity between the axis of rotation 146 and the axis of the arbor 147 will be seen to be equal to $C + \tfrac{1}{2}T$. In this way the pieces in which the bore is oversize to the extent where they equal $R_{max}$ will have an axis of generation through point 148. While those pieces in which the bore is undersize and equal to $R_{min}$ will be formed about an axis through point 149. The pieces which have a bore radius within the maximum allowed tolerances will have their axis of generation positioned somewhere between two points, 148 and 149.

To give a concrete example, suppose that a number of blanks are to be machined on a lathe and the radial bore specified for the blanks is 2.000", plus or minus .005", thus $R_s = 2.0"$ and $T = .010"$; and it is further decided that a radial clearance C of .005" be allowed, in order that the minimum size blank will slip readily on and off the arbor. Thus $R_{min} = 1.995$ and $R_a = 1.990$. The formula $$E = C + \tfrac{1}{2}T$$

is applied, and substituting the above figures in this formula, we will have $$E = .005 + \tfrac{1}{2}(.010)$$

which, when resolved, will give a figure of .010 for E.

As a further example, suppose that a hob is to be used which will have a minimum internal diameter of 2.000" and a maximum internal diameter of 2.0004". In order that the hob may be readily emplaced and removed from the arbor, the diameter of the arbor is made 1.995"; therefore $R_{min} = 1.0000"$, $R_{max} = 1.0002"$, $R_s = 1.0001"$, $R_a = .99975$, $C = .00025$, and $T = .0002$. Applying these figures to the formula $$E = .00025 + \tfrac{1}{2}(.0002) = .00035$$

Figure 19:
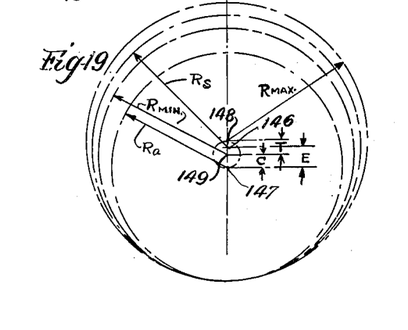
Fig. 19 is a diagram for illustrating the compensating eccentricity which may be given to the shank of a male arbor.

The formula is equally applicable to male and female arbors, although Fig. 19 only illustrates it as applied to a male arbor. By referring to Fig. 16 it will be seen that in the case of the female arbor, the axis of the arbor bore 136 is above the axis of rotation 137 instead of below, as in the case of the male arbor.

It will be apparent to one skilled in the art that in some practices it may be desirable to obtain the compensating eccentricity by movement of the whole chuck, rather than by making a portion of the chuck eccentric to another portion thereof. For instance, referring to Fig. 1, if it were desired to use the chuck 10 for several different sizes of bores or workpieces, the circumferential wall 17, which is to receive the workpiece, could be made concentric to the chuck base 11, and the eccentricity could be obtained by adjustment of the arbor base 11 in relation to the face plate 13 by loosening bolts 12 and sliding the chuck back and forth until the correct position was obtained.

The procedure would be the same as has been described for the production of an eccentric chuck, and is equally applicable to either a male or female chuck. The offset from the axis of rotation is made in a direction opposite to that of the movement of the tightening member when clamping the workpiece in place. The amount of the eccentricity is computed from the formula $E=C+\frac{1}{2}T$ in the same manner as previously explained, except that C will be computed and will be the difference between $R_a$ and $R_{min}$.

By obtaining the eccentricity in this manner the arbor may be used for several sizes of bores or workpieces within a limited range; the range will be governed by the amount that the tightening member can be extended by rotation of the eccentric. To some extent this range can be increased by the substitution of a longer tightening member.

To give a specific example of such adaptability, assume that the radius of the arbor is 1.990" and the blanks used are specified with a radial opening of 2.000", plus or minus .005". This is the first example previously given, and the eccentricity was there computed to be .010".

Now assume that the design has been changed or a new blank is being used that is to have an internal radius of 2.010", plus or minus .002". In such a case $R_{min}=2.008"$, $R_{max}=2.012"$, and $T=.004"$. C will equal $R_{min}$ minus $R_a$, which equals 2.008" minus 1.990", or .018". Applying the formula, $$E=C+\frac{1}{2}T=.018+\frac{1}{2}(.004)=.020$$

Thus, by merely changing the offset (eccentricity) of the arbor it is adapted to changed manufacturing conditions, and yet is still capable of unerringly producing the same high quality standards of accuracy, because once the eccentric adjustment had been made, the centering of the workpiece on the arbor is determined by the side of the arbor opposite the tightening member, and that part, being immovable, will not be affected by the factors governing the operational accuracy of ordinary chucks. In addition the errors resulting from the allowable bore tolerances will be evenly distributed about a predetermined mean, as previously explained.

It is readily apparent that where the eccentricity is exceedingly fine, it may be difficult to make the proper adjustment between the base 11 of the chuck and the face plate 13. In such a case, or, possibly, in other cases also, it may be desirable to provide a chuck in which the axis of generation of the circumferential wall 17 may be adjusted transversely with respect to the axis of generation of base 11, the line of movement of one part with respect to the other being along a diametrical line which is substantially parallel to the radial line of movement of tightening member 18. Means for providing such movement might include a pair of interlocking ways (lying parallel to such diametrical line) in order to govern the direction of movement, and a screw thread adjustment to govern the extent of movement.

Throughout the specification and claims, the term "eccentric," unless otherwise indicated, is intended to denote a surface which may be turned on a lathe or similar machine, as distinguished from one that must be milled or formed on shape-cutting machine.

The description of selected forms of my invention in specific detail for the purpose of disclosure, and to illustrate the principles involved, will suggest various changes and substitutions that may be made in practice, and I reserve the right to all such departures from my description that lie within the scope of my appended claims.

I claim:

1. In an expansible arbor for engaging the center bore of a workpiece, a hollow arbor body having an axis of rotation, the circumferential surface of the arbor body being a right cylinder and having its longitudinal axis offset in one radial direction from said axis of rotation, said hollow body having an aperture in its circumferential wall, a tightening member mounted in said aperture, and a cam in said arbor body for moving said tightening member outward to an extended position in pressure contact with the inner surface of said center bore, said aperture being positioned in the opposite radial direction from said offset axis whereby the outward movement of the tightening member compensates for the eccentricity of the arbor member.

2. In an expansible arbor for engaging the center bore of a workpiece, a hollow arbor body having an aperture in its circumferential wall, a single tightening member slidingly mounted in said aperture for outward and inward movement through the aperture to clamp the workpiece to the arbor, the inner end of said tightening member being enlarged to greater dimension than said aperture to limit the outward movement of the tightening member, and an eccentric comprising an eccentrically mounted cylindrical cam in said arbor in peripheral contact with the inner end of said tightening member for forcing the tightening member outward.

3. In an expansible arbor for engaging the center bore of a workpiece, a hollow arbor body having an aperture in its circumferential wall, a single tightening member slidingly mounted in said aperture for outward and inward movement through the aperture to clamp the workpiece to the arbor, and an eccentric comprising an eccentrically mounted cylindrical cam in said hollow body for rotation to force said tightening member outward against the inner surface of said bore, one end of said eccentric protruding beyond the hollow body and being shaped for engagement by a tool for manual rotation of the eccentric.

4. In an expansible arbor for engaging the center bore of a workpiece, a hollow arbor body having an aperture in its circumferential wall, a tightening member slidingly mounted in said aperture for outward and inward movement, an eccentric in said hollow body for rotation to force said tightening member outward against the inner surface of said bore, one end of said eccentric protruding beyond the hollow body and being shaped for engagement by a tool for manual rotation of the eccentric, said eccentric having a circumferential groove concentric to its axis of rotation positioned within said hollow body, and means carried by the hollow body to retractably enter said groove to limit axial movement of the eccentric relative to the hollow body.

5. In an expansible arbor for engaging the center bore of a workpiece, a hollow arbor body having an axis of rotation, approximately one-half of the circumference of said body being concentric with said axis at a radius correponding substantially to a force fit with the center bore of the workpiece, the remainder of the circumference being at a lesser radius to permit free movement of the workpiece onto the arbor, an aperture in said lesser radius portion of the arbor body, a tightening member mounted in said aperture, and an eccentrically mounted cylindrical cam in said arbor body to force said tightening member outward to substantially said first-mentioned radius.

6. In an expansible arbor for engaging the center bore of a workpiece, a hollow arbor body having an external diameter slightly less than the internal diameter of the center bore, a single tightening member for locking the arbor to the workpiece, said member being mounted for radial movement through an aperture in the arbor body into engagement with a surface of the center bore, and means including an eccentrically mounted cylindrical cam within the arbor body for forcing the tightening member outwardly, whereby the side of the arbor body remote from the tightening means is brought into firm engagement with said bore.

7. In an expansible arbor for engaging the center bore of a workpiece, a hollow arbor body shaped and disposed to engage less than half the surface of the center bore, a single tightening member for locking the arbor to the workpiece, said member being mounted for radial movement through an aperture in the arbor body into engagement with the surface of the center bore, rotatable means comprising an eccentrically mounted cylindrical cam within the arbor body for forcing the tightening member outwardly whereby the side of the arbor body remote from the tightening means is brought into firm engagement with said bore, and means for limiting outward movement of the tightening member.

8. An arbor for supporting a workpiece for rotation about a given axis of rotation comprising a body having a cylindrical work-receiving surface, tightening means located entirely on one side of the axis of the body for movement in and out through aperture means extending through a portion of the work-receiving surface, and an eccentrically mounted cylindrical cam in the body operatively engaging the tightening means for moving the same into engagement with the workpiece, said work-receiving surface being deliberately made eccentric by having its center displaced from said axis of rotation in the direction opposite from the direction of locking movement of the tightening means.

9. An arbor for supporting a workpiece for rotation about a given axis of rotation comprising a body having a cylindrical work-receiving surface, tightening means located entirely on one side of the axis of the body for movement in and out through aperture means extending through a portion of the work-receiving surface, and an eccentrically mounted cylindrical cam in the body operatively engaging the tightening means for moving the same into engagement with the workpiece, said work-receiving surface being deliberately made eccentric by having its center displaced from said axis of rotation in the direction opposite from the direction of locking movement of the tightening means by an amount equal to substantially half the maximum difference in the dimensions of the work-receiving surface and the mating portion of the workpiece, whereby average differences between said dimensions within the tolerances permitted in the workpiece will cause the workpiece to rotate on true center.

10. An expansible arbor for engaging the center bore of a workpiece and characterized in part by having tightening means located solely on one side of the arbor adapted to force an opposed fixed surface of the arbor into firm engagement with the workpiece to lock the workpiece to the arbor, said arbor comprising a tubular arbor body having aperture means in its circumferential wall, tightening means mounted in the aperture means for outward and inward radial movement, and an eccentric in said arbor body in peripheral contact with said tightening means for forcing the tightening means outwardly against the bore of the workpiece thereby to force an opposed fixed surface of the arbor periphery into firm engagement with the bore of the workpiece, said eccentric comprising an eccentrically mounted cylindrical cam.

11. In an expansible arbor for engaging the center bore of a workpiece, a hollow arbor body having aperture means in its circumferential wall, tightening means located entirely on one side of the axis of the body for movement in and out through said aperture means, and means including an eccentrically mounted cylindrical cam in said arbor in peripheral contact with said tightening means for forcing the tightening means outwardly into engagement with the bore of the workpiece and to force the opposite side of the arbor body into clamping engagement with the opposite portion of the workpiece bore, the eccentricity of said eccentric being great enough to cause said tightening means to secure a workpiece rigidly on the arbor body and small enough for the eccentric to maintain its tightened position by friction.

12. An arbor as set forth in claim 8 for cooperation with a cylindrical workpiece surface and in which the eccentricity of the work-receiving surface is computed from the formula $E = C + \frac{1}{2}T$, where E is the eccentricity, C the clearance and T the total allowable tolerance for the workpiece, whereby the axis of rotation of a workpiece that has one-half the allowable tolerance for said workpiece surface will coincide with the axis of generation of said workpiece surface.

13. An arbor as set forth in claim 8 for cooperation with a cylindrical workpiece surface and in which the eccentricity of the work-receiving surface is equal to substantially one-half the maximum difference, permitted by tolerance specifications, between the diameters of the work-receiving surface and said cooperating workpiece surface, whereby average differences between said diameters within the tolerances permitted in the workpiece will cause the workpiece member to rotate on true center.

14. An arbor as set forth in claim 8 in which the work-receiving surface is in the form of a cylindrical shank adapted to fit within a bore in the workpiece.

15. An arbor as set forth in claim 8 in which the work-receiving surface is in the form of a cylindrical bore adapted to receive an outer cylindrical surface on the workpiece.

16. An arbor as set forth in claim 3 in which said protruding end of the eccentric has an outboard bearing surface.

17. An arbor as set forth in claim 11 in which a member rigid with the eccentrically mounted cam extends beyond the arbor body for manual rotation to operate the cam.

18. An arbor as set forth in claim 11 in which the tightening means is spring-urged into retracted position.

19. An arbor as set forth in claim 11 in which the tightening means includes a plurality of spaced keys.

20. An arbor as set forth in claim 11 in which the tightening means includes a plurality of spaced keys and in which bearing supports for the eccentrically mounted cylindrical cam are provided between at least some of said spaced keys.

21. An arbor as set forth in claim 8 in which the axis of the arbor is offset from the axis of rotation by an amount not more than .003 inch.

CARL E. OVERTON.

REFERENCES CITED

The following references are of record in the file of this patent:

UNITED STATES PATENTS

| Number | Name | Date |
| --- | --- | --- |
| 258,598 | Pope | May 30, 1882 |
| 705,724 | Upson | July 29, 1902 |
| 799,912 | Masterson | Sept. 19, 1905 |
| 965,131 | Bliss | July 19, 1910 |
| 1,334,335 | Warren | Mar. 20, 1920 |
| 1,355,142 | Hanson | Oct. 12, 1920 |
| 1,401,281 | Rohs | Dec. 27, 1921 |
| 1,438,250 | Lyon | Dec. 12, 1922 |
| 1,446,973 | Junkers | Feb. 27, 1923 |
| 1,467,821 | Tuttle | Sept. 11, 1923 |
| 1,791,224 | Perkins | Feb. 3, 1931 |

FOREIGN PATENTS

| Number | Country | Date |
| --- | --- | --- |
| 549,225 | Germany | Apr. 25, 1932 |